United States Patent Office 2,782,515
Patented Feb. 26, 1957

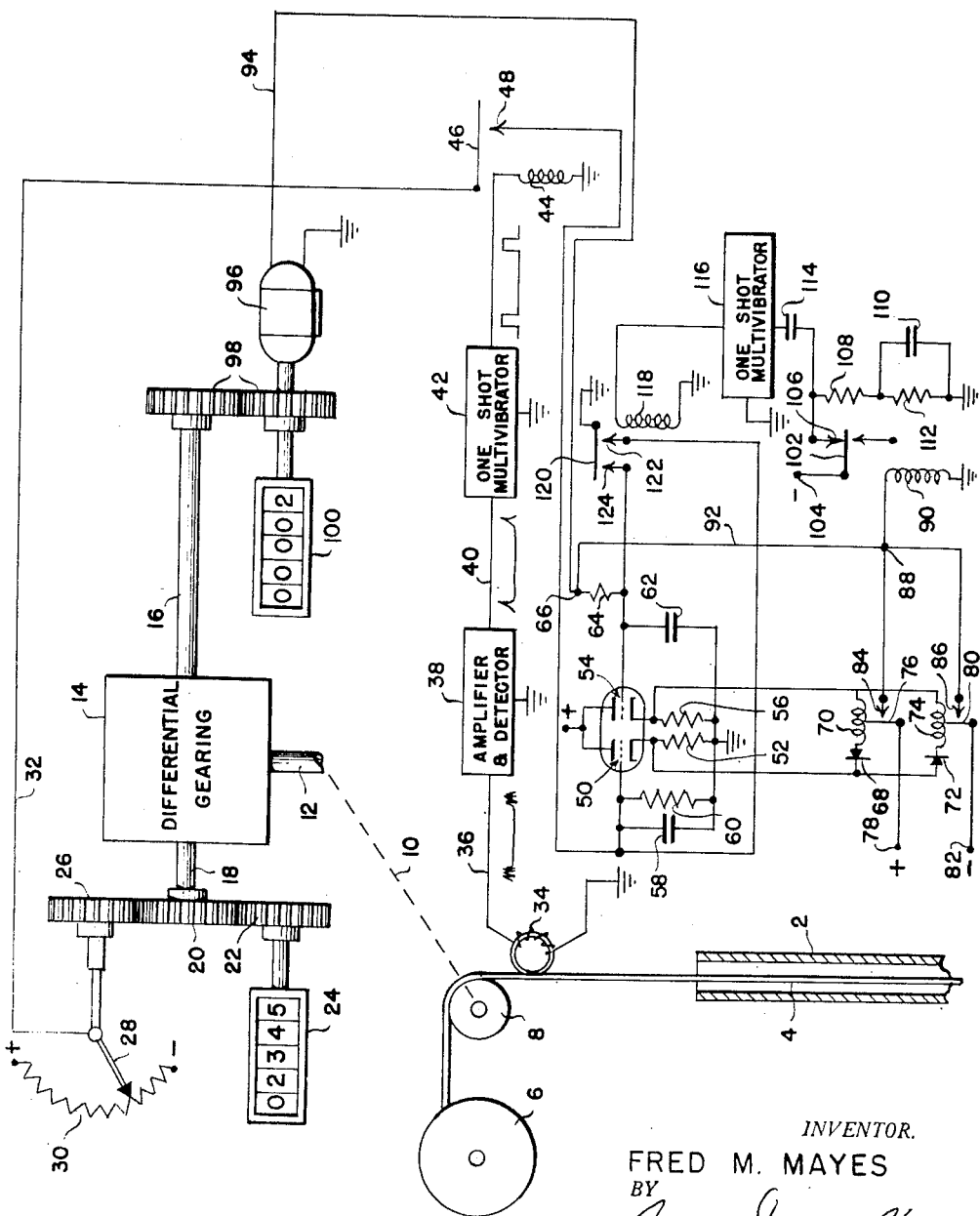

2,782,515

DEPTH MEASURING SYSTEM FOR WIRE LINES

Fred M. Mayes, Newtown Square, Pa., assignor to Sun Oil Company, Philadelphia, Pa., a corporation of New Jersey Application November 3, 1955, Serial No. 544,700

8 Claims. (Cl. 33—129)

This invention relates to a depth measuring system for wire lines particularly such as are used in operations in bore holes in connection with such procedures as logging, well surveying, shooting, calipering, or the like.

In the uses just indicated it is required that the depth measurements of instruments carried by wire lines should be made to a rather high degree of accuracy. Commonly, depth measurements on wire lines are made by counting the turns of a drum or pulley over which the wire passes. In order to obtain reasonable precision in this measurement it has been found necessary to wrap the wire line a full turn about the drum or pulley. This damages the wire and sometimes the wire breaks when it jumps the groove under tension, causing loss of the wire and instruments in the hole. Proposals have accordingly been made to "mark" the wire line magnetically by magnetic markers permanently imposed on the line or impressed thereon as the line goes into the hole with fixed spacings resulting from a definite spacing of a pair of magnetic heads. Measurements of depth are then made by counting the magnetic markers as the wire line is either lowered into the hole or raised from the hole. There are, however, serious drawbacks to this magnetic marking method. First, the wire material is not ideal as a magnetic recording medium, necessarily having a diameter considerably larger than would be desirable. Thus the signal-to-noise ratio is fundamentally limited. Secondly, a large range in wire speed must be expected in normal operation. Wire speeds up to five hundred feet per minute are used going into a hole and at the other extreme very low speeds as little as five feet per minute may be encountered. Thus any frequency selective networks used to improve signal-to-noise ratio would necessarily have a very broad band or would have to be automatically controlled by the speed. Frequency modulation techniques are not attractive because of the large speed ranges encountered.

In view of the foregoing there is a very considerable possibility of missing the counting of a pulse or of counting a spurious noise, and either of such occurrences will introduce cumulative errors into the depth measurement.

The broad object of the present invention is the provision of a system which involves the use of magnetic markers but in a fashion which is free of cumulative error. In brief, a basic measurement is made by a simple (and not very accurate) pulley and counter. The reading of the counter is then automatically corrected, or synchronized, by magnetic markers at fixed spacings. Missing one of the magnetic marker pulses would only mean that the synchronizing or correcting system would not operate for that particular pulse, but no direct error would be introduced. Furthermore by limiting the amount of correction which could be produced by a single operation of the synchronizing system there is a limit to the error which might be due to a single spurious pulse, and this error would be removed upon the occurrence of the next legitimate synchronization pulse produced by a marker.

In accordance with the invention the synchronizing markers are spaced by such distance that, within its limits, the error due to inaccuracy of the pulley arrangement would not be serious. For example, in ordinary operations, the markers may be spaced at ten foot intervals, the cumulative error of pulley operations in such an interval being relatively small and inconsequential. It will, of course, be understood that where a very high degree of accuracy is required the markers may be applied at shorter intervals to the line.

The attainment of the broad object referred to above together with subsidiary objects particularly relating to details of the system, will be apparent from the following description read in conjunction with the accompanying drawing in which the figure is a diagram showing a preferred form of the system.

The surface casing of a well is indicated at 2 and into this there is shown as running a wire line 4 which may be the support for some instrument or apparatus of the type indicated above, i. e., provided for well logging, well surveying, shooting, calipering, pressure determination, or the like. The wire line 4 is arranged to be raised or lowered by a winch 6 and passes over a measuring pulley 8 en route to the hole. As will shortly appear, the measuring pulley need not be particularly accurately driven by the wire line and consequently it suffices to have it pass over only a limited arc of the pulley without the necessity for being wrapped a full turn about it. For purposes of description it may be assumed that in a movement of the wire line of ten feet the slippage of the pulley with respect to it is of inconsequential amount for the particular use involved.

The pulley 8 has mechanical connection indicated at 10 to one input shaft 12 of a differential gear box 14, the other input shaft of which is indicated at 16, and the output shaft of which is indicated at 18. Through gears 20 and 22 the output shaft drives a counter 24 which will exhibit depth readings which for purpose of description may be assumed to be read in feet. (As will appear greater accuracy may be provided.)

The output shaft 18 also drives through gears 29 and 26 the contact arm 28 of a potentiometer the resistance of which is indicated at 30. The terminals of this resistance are connected to respective positive and negative supply voltages. Each time zero appears in the unit wheel of the counter 24 it may be assumed that the contact 28 engages a point of zero potential of the resistance 30. The resistance 30 desirably subtends only a fraction of a circumference, for example subtending the arc made by the pointer in traveling a distance corresponding to a movement of one foot of the wire line. Throughout the remainder of a revolution the contact 28 does not engage the resistance 30. As will later appear this limits the amount of correction which may be effected by reason of a single marker so that spurious signals will not effect such a degree of correction as will produce a cumulative error.

The wire line may be assumed to have magnetic markers thereon at regular intervals, these markers being permanently applied, and consistent with what is being described being spaced at ten foot intervals. Desirably these markers are applied in short groups of relatively high frequency markings so that even if the wire line is moving slowly an alternating signal will be picked up by the magnetic pick-up 34 to provide an alternating signal on the output line 36 which may be readily amplified and at least distinguished to a substantial degree from noise signals which may be delivered by the pick-up. A suitable amplifier 38 is provided and has a sufficiently broad band of response to amplify the signals at such frequencies as occur due to a wide range of speeds of the wire line. The amplifier 38 embodies a detector which will produce for each high frequency pulse a single pulse on the line 40. The pulses thus produced are used to trigger a single-shot multivibrator to provide at its output rectangular pulses of substantially constant short duration. The multivibrator thus provided may be of any conventional type. The pulses produced by it serve to energize a relay coil 44 the armature of which, indicated at 46, is connected through line 32 to the potentiometer contact 28.

The armature 46 is arranged to engage, when the coil 44 is energized, a contact 48 which is connected to the grid of a triode 50 which is provided in a cathode follower circuit including the cathode resistor 52 running to ground. Associated with triode 50 is a second triode 54 which is also in a cathode follower circuit including the cathode resistor 56 running to ground. An RC circuit connects the grid of triode 50 to ground and comprises the capacitor 58 and resistor 60. The grid of triode 54 is connected to ground through capacitor 62 and is also connected to a charging resistor 64 which runs to a terminal 66.

Between the cathodes of triodes 50 and 54 there are connected a pair of selective relay arrangements. One of these comprises the diode 68 in series with a relay coil 70. The other comprises a diode 72 in series with a relay coil 74. As will be noted from the diagram the diodes are oppositely polarized with respect to the two triodes so that current will flow through one or the other of the coils 70 and 74 depending upon which of the cathodes is positive with respect to the other. The armature 76 of the relay having coil 70 is connected to a positive voltage source 78. The armature 80 associated with the other relay having the coil 74 is connected to a negative voltage source 82. The relay contacts 84 and 86 are connected to a common terminal 88 between which and ground there is located a relay coil 90. The terminal 88 is also connected at 92 to the terminal 66 above mentioned, and this terminal is connected at 94 to a reversible direct current motor 96 which through gearing 98 serves to drive the input shaft 16 of the differential gear box 14. The motor also drives a counter 100 which, as will appear, serves for checking the proper operation of the system.

The motor 96 runs in a forward or reverse direction depending upon the sign of the applied voltage, the supplies to the terminals 78 and 82 having a common ground.

The armature 102 of the relay having coil 90 is connected to a negative voltage terminal 104 and when the relay is deenergized makes contact with a contact point 106 which is connected to ground through the series arrangement of resistor 108 and capacitor 110, the latter being shunted by a relatively high resistance 112. The contact point 106 is also connected through capacitor 114 to a single shot multivibrator 116 which is of conventional type providing a rectangular output pulse of fixed duration upon the reception of each sharp negative pulse from the terminal 104. The output of the multivibrator 116 serves to energize a relay coil 118 which attracts armature 120 to connect to ground the contact points 122 and 124 which are respectively connected to the grids of triodes 50 and 54.

The operation of the system is as follows:

Assuming shaft 16 stationary, the pulley 8 approximately measures the depth of the wire line, delivering a reading through the differential gear box to the counter 24. At the same time it produces rotation of the potentiometer contact 28. As stated above, initial adjustment is so made that the contact 28 engages a point of zero potential on the resistance 30 when the counter passes through conditions of zero of its unit wheel. If one of the magnetic markers on the wire line is picked up at 34 when the contact 28 encounters the zero potential point, the relay 44 is energized by the marker and contact is made between armatures 46 and 48. A zero potential, however, is applied to the capacitor 58 and the grid of triode 50, the capacitor having been previously grounded as will hereafter appear. Accordingly the potential of the cathode of triode 50 being very nearly zero, there will be no current flowing through the relay coils 70 and 74, the capacitor 62 also having been grounded to produce a substantially zero potential at its cathode. (More accurately speaking, considering the triodes 50 and 54 to be similar and resistors 52 and 56 to be equal, the potentials of their cathodes will be equal though perhaps somewhat above ground.) In the case of operation as just described no corrective action is produced.

On the other hand, let it be assumed that a marker is picked up when the contact 28 is off the zero potential position so that either a positive or a negative potential appears on the line 23 when the relay 44 is energized. In such case assuming the resistance of potentiometer 30 to be low and the potentials at its terminals adequate, the capacitor 58 will be charged during the duration of the pulse to the multi-vibrator 42 to a potential which corresponds to the error measured by the deviation of the instant of reception of the signal from the marker from the zero potential position of the contact 28. The duration of contact at 48 is quite small and may be regarded of negligible duration so that the capacitor 58 retains for a time a potential corresponding to the instantaneous position of the contact 28 at the time of the signal from the magnetic marker. Under the conditions just outlined one or the other of relay coils 70 and 74 will be energized depending upon whether the potential at the grid of triode 50 is positive or negative. As a result either a positive or negative potential will be applied to terminal 88 and from it to the reversible motor 96 serving to drive it in a direction dependent on the polarity of the applied potential. Connections are so made that the motor then drives the counter 24 through the differential gear box to apply a proper sense of correction to the counter. When the positive or negative potential is applied to terminal 88 it produces through terminal 66 and resistor 64 charging of the capacitor 62 in the corresponding sense, the charging taking place to bring the potential of the grid of triode 54 toward equality with the potential of the grid of triode 50. The RC constant of the arrangement of resistor 64 and capacitor 62 is so chosen in relation to the speed of motor 96, that full correction is substantially made by operation of the motor at the same time as the two grid potentials attain equality. It may be noted that the capacitor 58 is simultaneously discharging through resistor 60, but the time constant of this arrangement may be chosen to be rather large so that, practically, the capacitor 58 may be regarded as maintaining its charge throughout the correction interval. However, it will be obvious that this is not necessary since choices of time constants of both circuits associated with the grids in relationship to the speed of operation of the motor 96 may be so chosen as to secure substantially complete correction. Actually complete correction is not at all necessary since it may be assumed that in the interval between successive markers the slippage at the pulley 8 is of a negligible amount though it may not be permitted to become cumulative through a series of successive intervals.

The energization of terminal 88 also energizes the relay coil 90 breaking contact at 106 and moving the armature to the unconnected backstop. Theretofore, the capacitor 110 will have been charged substantially to the negative potential of terminal 104, and upon breaking contact at 106 it will relatively slowly discharge through resistor 112, the resistor being chosen so as to provide a relatively high time constant. The result is an insufficient pulse through capacitor 114 to trip the multivibrator 116 at this time. However, when the cathodes of the triodes 50 and 54 approach equality to such extent as to open either armature 76 or armature 80 which has been energized, relay coil 90 will be deenergized, and the motor stopped. The deenergization of relay coil 90 will permit armature 102 to engage again the contact 106 providing a sharp negative pulse through capacitor 114 to the multivibrator 116 thereby producing energization of relay coil 118 and grounding the triode grids thereby bringing the apparatus to initial condition.

It will be evident from the foregoing that if the pickup 34 detects each magnetic marker, there will be correction made as each marker is detected to serve to maintain accuracy of indications on the counter 24. Two deviations from proper operation are, however, possible. One is failure of the pickup to detect a marker. The other is the existence of such a disturbance at the pickup as will produce a spurious indication of a marker which is not present.

In the former case, this means only that upon the passage of a particular marker no correction is made. However when the next marker is picked up, a correction will be made as described above and this may only be a correction somewhat in excess of that normally provided.

On the other hand, if a spurious "marker" is picked up to provide a corrective signal, an improper corrective operation will be set up, but without serious consequence. First, it may be remarked, that spurious signals produced when the contact 28 is not engaged with potentiometer resistance 30 will have no effect since no potential will be applied to the grid of triode 50. If a spurious marker is picked up when there is contact between 28 and resistance 30, the system will attempt correction. But it will be noted that the operation of the motor 96 in a single cycle is always limited through the charging action of the circuit comprising resistor 64 and capacitor 62 and the amount of correction attempted can at most be that corresponding to a maximum positive or negative potential applied to the contact 28. A substantial temporary error may be produced by the spurious correction, but this will be recorrected upon the next proper operation due to an actual marker setting up a correction cycle. Thus the system does not provide any cumulative error, the error at most being very temporary.

The counter 100 reflects in its indications the corrective operations effected by the motor 96. If there is a constant slippage at the pulley 8, the counter may be expected to advance at a rate corresponding to this slippage. Desirably, of course, the pulley 8 should be chosen of such diameter that taking into account slippage it would, if operating properly, require no correction of the readings on counter 24. If this is done proper operation would then involve a general balancing of forward and reverse operations of motor 96 or at least only a gradual accumulation, either positively or negatively, of readings on counter 100. If the counter 100 gives readings which are beyond reasonable expectations it will indicate that the measurements must be disregarded due to some misoperation of the system.

The magnetic markers on the wire line have been described above as only indicating particular intervals for the purpose of synchronizing the indicator which is depended upon for accurate depth measurements. However, the wire line may contain other coding in the form of magnetic markers along its length arranged for precise indication of depth, such coding corresponding, for example, to that described in my application, Serial No. 493,367, filed March 10, 1955. In such case the mechanical indicator, synchronized as described herein, may be used for approximate depth measurements while the coding on the line itself may be used for precision measurements. The markers for synchronization and for such coding may be distinguished by different frequency characteristics, by the use of double pulses for synchronizing markers, or the like.

It will be evident that various details may be modified by those skilled in the art without departure from the invention as defined in the following claims.

What is claimed is:

1. Means for measuring longitudinal displacement of a flexible elongated member comprising a displacement indicator, means driven by said member in approximate conformity with its displacement and driving said indicator, said member being provided with equally spaced markers, means detecting said markers, and means controlled by deviations of occurrence of detection of a marker from predetermined indications of said indicator for applying corrections to said indicator.

2. Means according to claim 1 in which said markers are magnetic.

3. Means according to claim 1 in which said indicator is driven through differential gearing from said driven means and from said correction applying means.

4. Means according to claim 1 in which the correction applied in each operation is of limited amount.

5. Means according to claim 1 in which the amount of correction applied by the last means in an operation thereof is approximately proportional to the magnitude of the deviation involved.

6. Means according to claim 4 in which the amount of correction applied by the last means in an operation thereof is approximately proportional to the magnitude of the deviation involved within said limited amount.

7. Means according to claim 1 in which said means for applying corrections is a motor operated for a period corresponding to the magnitude of the deviation involved.

8. Means according to claim 3 in which said means for applying corrections is a motor operated for a period corresponding to the magnitude of the deviation involved.

No references cited.